(12) United States Patent
Sathianathan et al.

(10) Patent No.: US 6,179,551 B1
(45) Date of Patent: Jan. 30, 2001

(54) GAS TURBINE CONTAINMENT CASING

(75) Inventors: Sivasubramaniam K Sathianathan, Burton-on-Trent; Michael R Lawson, Derby; Sunil V Charadva, Leicester, all of (GB)

(73) Assignee: Rolls-Royce plc, London (GB)

( * ) Notice: Under 35 U.S.C. 154(b), the term of this patent shall be extended for 0 days.

(21) Appl. No.: 09/324,942

(22) Filed: Jun. 3, 1999

(30) Foreign Application Priority Data

Jun. 17, 1998 (GB) .................................................. 9812992

(51) Int. Cl.$^7$ ...................................................... F01D 21/00
(52) U.S. Cl. ............................ 415/9; 415/173.4; 415/197
(58) Field of Search ........................... 415/9, 200, 173.1, 415/173.4, 174.4, 196, 197

(56) References Cited

U.S. PATENT DOCUMENTS

| | | |
|---|---|---|
| 4,417,848 | 11/1983 | Dembeck . |
| 4,598,449 | 7/1986 | Monhardt . |
| 5,259,724 | 11/1993 | Liston . |
| 5,403,148 | 4/1995 | Forrester . |
| 5,408,826 | 4/1995 | Stewart . |
| 5,413,456 | * 5/1995 | Kulak et al. ............................. 415/9 |
| 5,485,723 | * 1/1996 | McCoy et al. ...................... 60/226.1 |
| 5,486,086 | 1/1996 | Bellia . |

* cited by examiner

Primary Examiner—Edward K. Look
Assistant Examiner—Richard Woo
(74) Attorney, Agent, or Firm—W. Warren Taltavull; Farkas & Manelli PLLC

(57) ABSTRACT

A containment casing for a gas turbine engine comprising a substantially rigid casing shell arranged in operation coaxially with an axis of rotation of the gas turbine engine. The casing extending circumferentially around an array of fan rotor blades which are arranged to rotate about the engine axis. In the region of the casing where it is predicted blade impact in the event of a fan blade failure, there is at least one reinforcing rib extending substantially radially from the casing and circumscribing the outer periphery of the casing shell. The ribs providing improved strengthening of the casing. Preferably a first rib is positioned about the casing between the operational position of the trailing edge and the mid chord point of the fan blade. A second rib is axially positioned between the operational position of the mid chord point and the leading edge of the fan blade. A third rib may also be positioned axially forward of the operational position of the leading edge of the fan blade. Also described are various ratios of the reinforcing ribs and the casing shell thickness to provide and improved lightweight casing.

11 Claims, 3 Drawing Sheets

GAS TURBINE CONTAINMENT CASING

BACKGROUND OF THE INVENTION

The present invention relates generally the design of gas turbine engine containment casings. In particular it relates to the design of containment casings which are provided to contain a fan blade, within the engine, during failure of a fan blade.

Turbo fan gas turbine engines are commonly provided with a fan rotor in the forward portion of the engine. The rotor assembly includes a rotor disc and a number of fan rotor blades. The fan rotor blades extend outwardly from the disc across a flow path for the working medium gases. These blades are more cambered and are considerably larger than the blades of the axial flow core compressors and turbines used in such engines.

The fan rotor blades are driven at high rotational speeds about an axis of rotation to provide the first stage of compression to the working medium gases, and propulsive thrust. Foreign objects, such as birds, hailstones or other objects, which are on occasion ingested into the engine with the working medium gases may strike and damage the blade to such an extent that the blade fails in the root region of the fan blade where it is attached to the rotor disc. The blade may also fail in the root region due to other causes. During such a failure a rotor blade may be hurled outwardly from the rotor assembly with considerable energy and at high speed.

Because of the size of the fan blades and the speeds at which they may be released in the event of failure, fan blades present a difficult containment problem. It being appreciated that it is desirable to contain a failed fan blade within the engine so that further damage to the aircraft or surrounding objects does not occur.

One known design of containment casing is described in U.S. Pat. No. 4,417,848. According to this patent an annular containment casing surrounds the outer portions of the fan blades. The thickness of this casing increases in an axially rearward direction such that the casing has a maximum thickness rearward of a plane passing through the mid-chord point of the rotor blades. This increase in thickness selectively reinforces the case against the predicted impact of blade fragments such that the blade does not penetrate the casing and is contained.

A problem with this design is that in order to withstand large fan blades and/or high impact velocities the casing thickness needs to be considerable and over a large area of the casing. This undesirably adds considerable weight to the engine casing. Furthermore such a containment casing design is not optimal and can be further improved.

It is therefore desirable to provide a containment casing that addresses the aforementioned problem and/or provides improvements to containment casings generally.

SUMMARY OF THE INVENTIONS

According to the present invention there is provided a containment casing for a gas turbine engine comprising a substantially rigid casing shell arranged in operation coaxially with an axis of rotation of the gas turbine engine, and extending circumferentially around an array of fan rotor blades arranged to rotate about the engine axis, and in a region of predicted blade impact in the event of a fan blade failure, there are at least two reinforcing ribs which extend substantially radially from the casing and circumscribe the outer periphery of the casing shell, wherein the ribs are of a generally T-shaped cross section comprising a substantially radially extending web portion and a rim portion, and wehrein the first rib is positioned axially about the casing between a plane perpendicular to the casing axis passing through the operational positions of the trailing edges of the fan blades, and a plane perpendicular to the casing axis passing through the operational positions of the mid chord points of the fan blades, and the second rib is positioned axially about the casing between the plane passing through the operational positions of the mid chord points of the fan blades and a plane perpendicular to the casing axis passing through the operational position of the leading edges of the fan blades.

The ribs selectively strengthen and stiffen the cylindrical shell of the containment casing thereby reinforcing the shell. The use of ribs is also more efficient than simply increasing the shell thickness. Consequently the shell can be of a thinner section than would be the case without the ribs producing a lighter, more optimal containment casing structure. In addition the ribs distribute the impact energy of a failed fan blade over a larger area of the containment casing thereby enabling the casing to better absorb the impact energy of a failed fan blade.

A third rib may also be provided, axially positioned forward of the plane passing through the operational positions of the leading edges of the fan blades.

The positioning of the ribs provides strengthening of the casing where it is required allowing the casing thickness in other areas to be reduced, thereby providing an improved lighter design.

The ratio of the axial width of the reinforcing rib rim portion, to the thickness of the casing shell radially adjacent to the operational positions of a trailing edge portions of the fan blades, is preferably in the range of 1 to 6. The ratio of the radial height of the reinforcing web portion from the casing, to the thickness of the casing shell radially adjacent to the operational positions of the trailing edges portions of the fan blades, is preferably in the ratio of 1 to 6.

Preferably the ratio of the thickness of the reinforcing rib rim portion, to the thickness of the casing shell radially adjacent to the operational positions of the trailing edge portions of the fan blades, is in the range 0.4 to 2.0; and the ratio of the axial thickness of the reinforcing rib web portion, to the thickness of the casing shell radially adjacent to the operational positions of the trailing edge portions of the fan blades, is in the range of 0.4 to 2.0.

Furthermore the ratio of the radial thickness of the casing in the region of the reinforcing ribs, to the thickness of the casing shell radially adjacent to the operational positions of the trailing edge portions of the fan blades, is may be in the range 0.4 to 2.0.

The ratio of the thickness of the casing shell axially rearward of the operational positions of the fan blades, to the thickness of the casing shell radially adjacent to the operational positions of the fan blades, is in the range 0.5 to 1.5.

Preferably the ratio of the thickness of the casing shell axially rearward of the operational position of the fan blades, to the thickness of the casing shell radially adjacent to the operational position of the fan blades, is in the range 0.4 to 1.5.

Preferably the ratio of the thickness of the casing shell axially rearward of a region of the casing shell or predicted main blade root impact in the event of fan blade failure, to the thickness of the casing shell radially adjacent to the operational position of the fan blades is in the range 0.3 to 1.5.

A fan catcher comprising a flange extending radially inwardly from an inner surface of the casing shell may be provided. The fan catcher positioned axially up to half a chord length of the fan blades forward of a plane perpendicular to the casing axis passing through the operational positions of the leading edges of the fan blades.

The ratio of the thickness of the casing shell forward of the fan catcher, to the radial thickness of the casing shell radially adjacent to the operational positions of the trailing edge portions of the fan blade, may be in the range 0.25 to 0.75.

Preferably the ratio of the thickness of the casing shell forward of the fan catcher, to the radial thickness of the casing shell radially adjacent to the operational position of the trailing edges portion of the fan blade, is in the range 0.1 to 0.75.

The present invention will now be described by way of example with reference to the following figures in which.

DESCRIPTION OF THE PREFERRED EMBODIMENT

Figure 1:
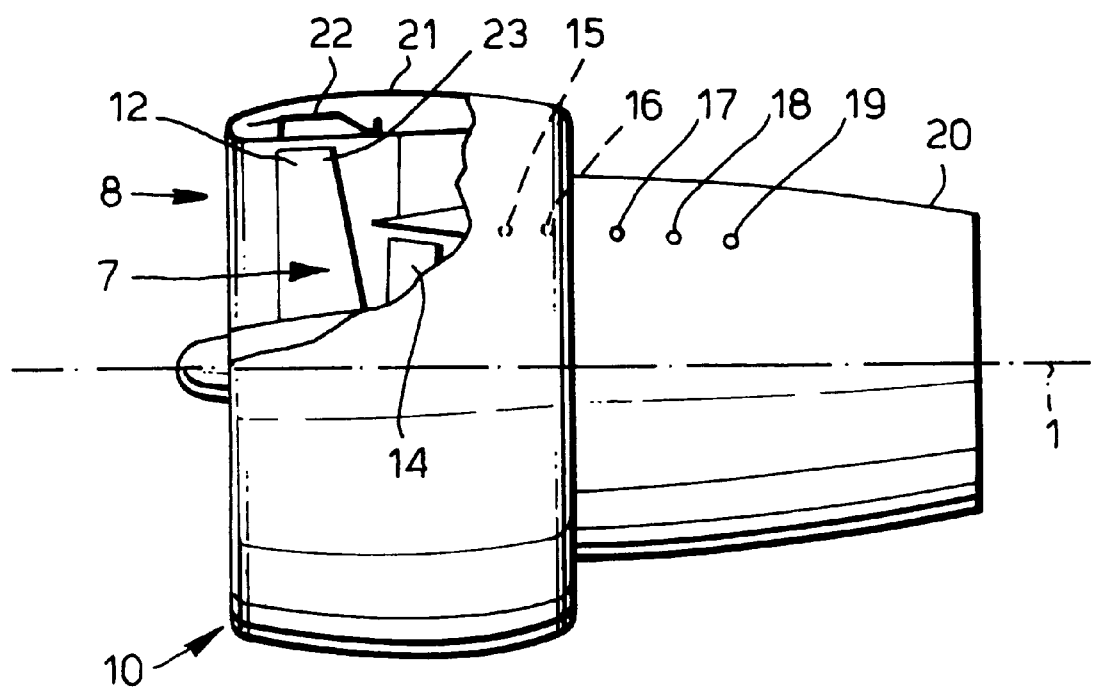
FIG. 1 shows a diagrammatic view of a turbofan gas turbine engine having a broken away casing portion disclosing a diagrammatic view of an embodiment of the present invention.

Referring to the drawings the turbofan gas turbine engine shown generally at 10 comprises in flow series a fan 12, an intermediate pressure compressor 14, a high pressure compressor 15, combustion equipment 16, and high, intermediate, and low pressure turbines indicated at 17, 18 and 19 respectively, the engine 10 terminating in an exhaust nozzle 20. A primary flow path 7 for the working medium gases extends rearwardly through the fan 12, compressors 14,15, combustion equipment 16, turbines 17,18,19 and nozzle 20. A secondary flow path 8, radially outward of the primary flow path 7, extends rearwardly through the fan 12 within a fan duct 21.

The fan 12, compressors 14,15, and turbines 17,18,19 are all of a conventional axial flow type and comprise annular arrays of rotor blades attached to a disc or drum to form a number of rotor assemblies. In operation these fan 12, compressor 14,15 and turbine 17,18,19 rotor assemblies rotate about a common engine axis 1 with the high pressure turbine 17 drivingly connected to the high pressure compressor 15, the intermediate pressure turbine 18 drivingly connected to the intermediate compressor 14, and the low pressure turbine 19 drivingly connected to the fan 12. Shafts (not shown) being used to provide the respective driving connections between the respective turbines 17,18,19 and compressors/fan 14,15,12. The energy required, in operation, to drive the respective fan 12 and compressors 14,15 is provided by the high energy gas stream produced within the combustion equipment 16 by burning fuel in air compressed by the upstream compressors 14,15 and fan 12.

The fan duct 21 is provided radially outwardly of the fan 12 and is connected to the remainder of the engine by radially extending struts not shown in the drawings. Within the fan duct 21 is provided a substantially cylindrical containment casing 22 arranged radially outwardly of the fan 12. The containment casing 22 being located such that in the event of a fan blade 12' failure the broken blade 12' will be contained within the engine 10, or alternatively the energy of the released blade 12' will be reduced to an acceptable level.

Upon the inner surface of the casing 22, radially between the tips of the fan blades 12' and the casing 22, there is an spacer 38. This is a lightweight honeycomb structure. The spacer 38 reduces the leakage of working fluid over the tips of the fan blades 12' by filling in the clearance between the tips of the fan blades 12' and the casing 22. Such a clearance being required to ensure that during normal running the fan 12 does not contact the casing 22 due to thermal and centrifugal radial growth of the blades 12'. To this end an abradable layer 36 is also provided on the radially inner surface of the spacer 38 to allow the tips of the fan 12 to cut their own clearance path through the spacer 38. The spacer 38 however has little strength and in the event of fan blade 12' failure, provides little assistance in containing the fan blade 12'. A failed fan blade 12' will therefore pass straight through the spacer 38 to the containment casing 22.

The design of a suitable containment casing 22 is based upon an understanding of the failure of a fan blade 12', the predicted energy that such a blade 12' will have, the likely trajectory of such a failed blade 12' and an analysis of the interaction of a failed blade 12' with the containment casing 22. Such an understanding being derived from analytical models and from experimental results.

The containment casing 22 comprises a generally cylindrical shell 24 substantially coaxial with the engine axis 1. The casing 22 may be manufactured from any metal, such as for example aluminium, steel alloys or titanium, conventionally used to produce known containment casings 22.

The containment casing 22 can be functionally divided axially into three separate zones, namely a main containment zone 30, a root impact zone 34, and a forward zone 32. The main containment zone 30 is in the region of the fan 12 where it is predicted that the main impact of a failed fan blade 12' will occur. The root impact zone 34, where it is predicted that the root portion of a failed fan blade 12' will impact the casing 22, extends downstream of the main containment area 34, downstream of the running position of the fan 12. The forward zone 32 is that portion of the casing 22 upstream of the main containment zone 30. It being appreciated that the casing 22 not only provides for containment of a failed fan blade 12' but also provides structural support for other parts of the engine 10.

Circumscribing the outer peripheral surface of the casing 22, within the main containment zone 30, are three reinforcing ribs or flanges 2,4,6. These ribs 2,4,6 are integral with the casing shell 24 and each comprises a web portion 42 extending generally radially from the casing shell 24 and a rim portion 40 at the radially distal end of the web portion 24. The rim portion 40 is arranged generally perpendicular to the web portion 42 and extends axially both sides of the web portion 42, such that the ribs 2,4,6 have a generally T-shaped cross section, as shown in FIG. 2.

The first rib 2 is positioned axially about the casing 22 in region shown by dimension $L_1$; between a plane 50 perpendicular to the engine axis 1 passing through the trailing edge 47 of the fan blades 12', and a similar plane 48 passing through the mid-chord point 45 of the fan blades 12'. The mid-chord point defined as the mid-point of a chord between the leading 49 and trailing 47 edges of the fan blade 12. The second rib 4 is axially positioned about the casing 22 within region shown by dimension $L_2$; between the plane 48 passing through mid chord point 45 of the blades 12 and a similar plane 46 passing through leading edge 49 of the fan blades 12'. The third rib 6 is positioned in a region shown by dimension $L_3$; between the plane 46 passing though the leading edge 49 of the fan blades 12' and a point up to half a chord length of the blades forward of the leading edge of the fan blades 12'. Typically up to 130 mm forward of the leading edge of the fan blades 12'.

The positions of the mid chord point 45 of the blades 12, leading edge 49, and trailing edge 47 of the fan blades 12', used to relate the casing axial locations of the reinforcing ribs 2,4,6, being those that are adopted by the fan 12 during operation. Furthermore these positions 45,47,49, for the purposes of locating the reinforcing ribs 2,4,6, all being defined as those positions found at the radially outward tips 23 of the blades 12'. It being appreciated that the casing design can be applied to gas turbine engines incorporating different types of fan blades 12'. For example it can be used with engines that incorporate swept fan blades, in which the positions of the mid-chord point 45, trailing edge 47, and leading edge 49, vary along the radial length of the blade. The fan blades 12' may also be of a conventional or wide chord design and may be either hollow or solid.

Figure 2:
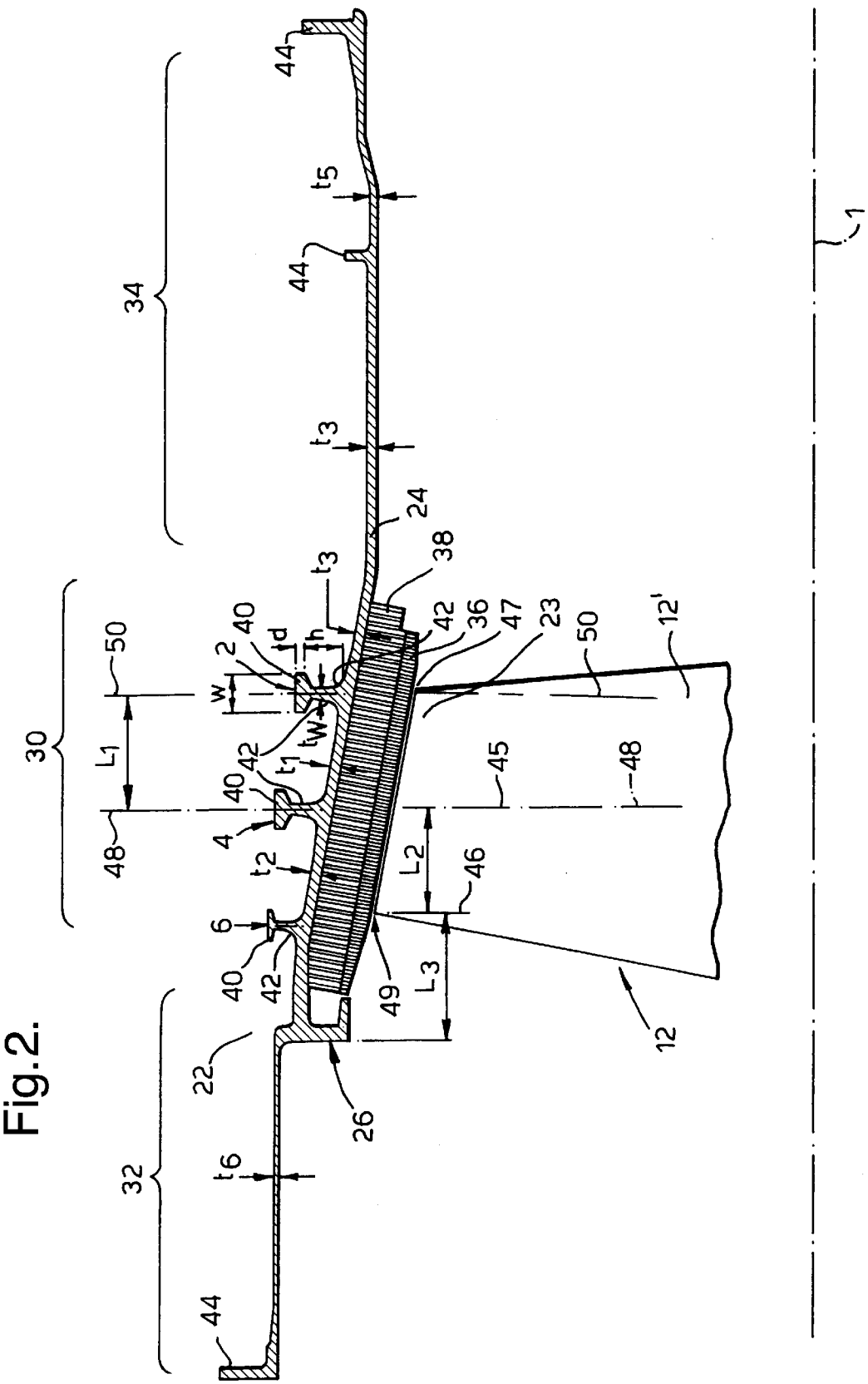
FIG. 2 shows and enlarged and more detailed cross-sectional view of the embodiment of the invention shown in FIG. 1.
Figure 3:
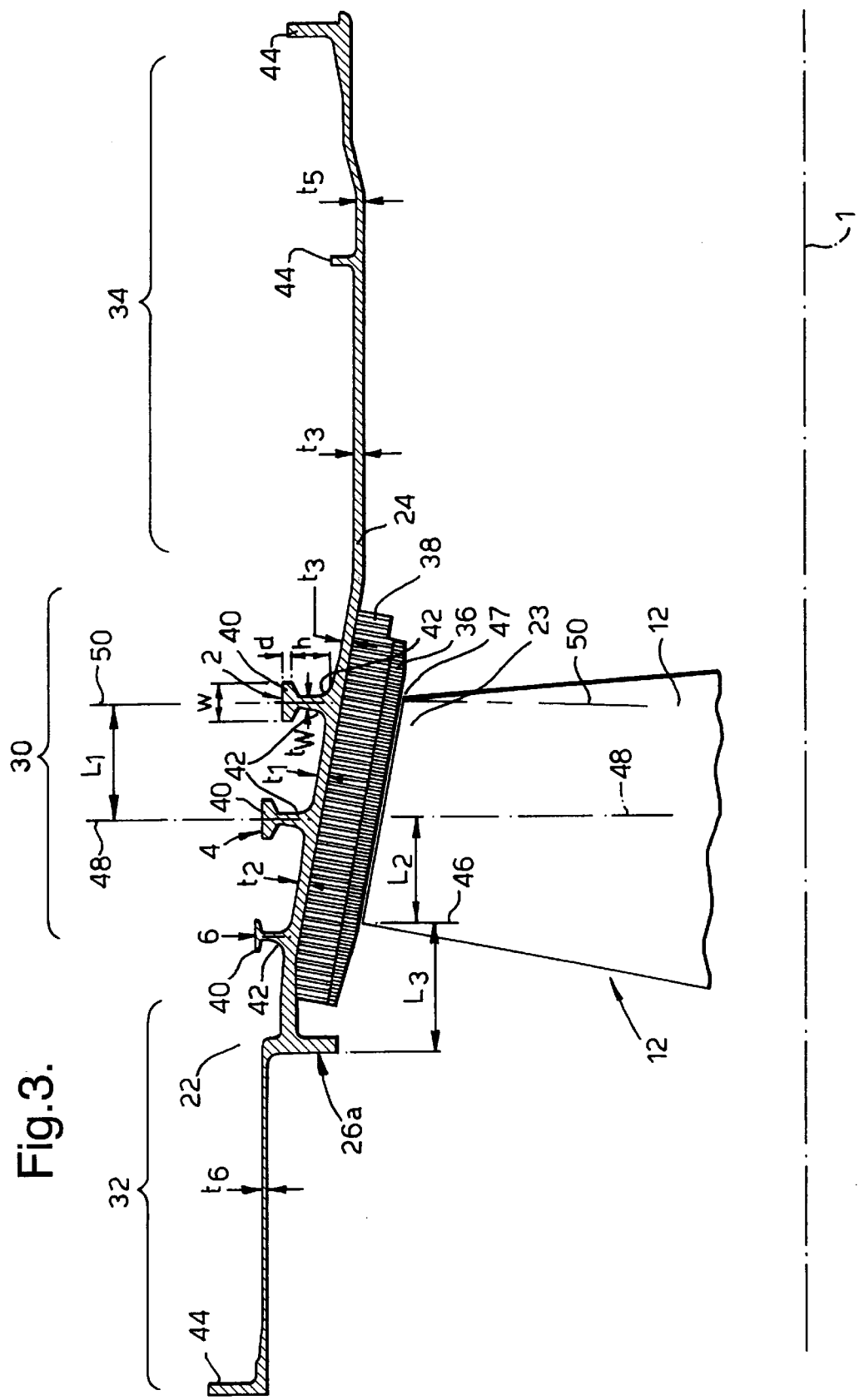
FIG. 3 shows a view similar to that shown in FIG. 2 of a second embodiment of the invention.

As shown in FIGS. 2 and 3 the ribs 2,4,6 are typically axially positioned with the first rib 2 adjacent to the trailing edge 47 of the fan blades 12', the second rib 4 adjacent to the mid-chord point 45 of the blades 12 of the fan blades 12' and the third rib 6 adjacent to the leading edge 49 of the fan blades 12'.

The thickness $t_w$ of the web portions 42 of the ribs 2,4,6, the height h of the ribs 2,4,6, the axial width w of the rim portions 40 of the ribs 2,4,6, and the thickness d of the rim portions 40 are related to the thickness $t_1, t_2, t_3$ of the casing shell 24 in the region of the ribs 2,4,6. The dimensions $t_w$, w, d and h not having been shown in FIGS. 2 and 3 for the other ribs 4 and 6 in the interests of clarity. The thickness of the casing shell 24 within the main containment zone 30, in the region of the ribs 2,4,6 is also optimised and varied. These dimensions are all optimised and are within by the following ratios; $t_2:t_1$=0.4 to 2.0, $t_3:t_1$=0.4 to 2.0, $t_w:t_1$=0.4 to 2.0, $d:t_1$=0.4 to 2.0, and $h:t_1$=1.0 to 6.0, $w:t_1$=1.0 to 6.0.

In order to ensure that a failed fan blade 12' impacts the casing 22 as predicted within the main containment zone 30 a fan catcher 26 may be provided upstream of the leading edge 49 of the fan 12. The fan catcher 26 defining the axially upstream extent of the main containment zone 30. The fan catcher 26 prevents or restricts a failed fan blade 12' from moving axially upstream once the failed fan blade 12' has impacted the casing 22. The use of such a fan catcher 26 is described in more detail in UK patent GB 1,369,229. As shown in FIG. 2 the fan catcher 26 may be in the form of a hook comprising a substantially L shaped flange extending radially inwardly from, and circumscribing, the inner surface of the casing 22. Alternatively the fan catcher 26a may comprise simply a radially inwardly extending flange, as shown in FIG. 3.

Within the forward zone 32, forward of the fan catcher 26 and the main containment zone 30, the thickness $t_6$ of the casing shell 24 can be reduced to fall within the ratio of $t_6:t_1$=0.25 to 0.75. Further testing and analysis has indicated that $t_6:t_1$ should preferably however fall within the ratio of $t_6:t_1$=0.1 to 0.75. By reducing the thickness $t_6$ of the casing shell 24 in this zone not only is the overall weight of the casing 22 reduced but also the load and deflection at the fan catcher 26 and the upstream portion of the main containment zone 30 is reduced.

Within the root impact zone 34 the casing shell 24 thickness $t_4, t_5$ is optimised to substantially the same as that of the main containment zone 30 with the casing shell thickness $t_4, t_5$ within the ratio of $t_4:t_1$=0.5 to 1.5 and $t_5:t_1$=0.5 to 1.5. The casing shell thickness $t_4, t_5$ typically though reducing in the downstream direction, as shown in FIGS. 2 and 3. Further testing and analysis has indicated that $t_4:t_1$=0.4 to 1.5. Further downstream, away from the main area of root impact the casing can be thinner with the ratio of $t_5:t_1$=0.3 to 1.5. Ribs can also be provided within this zone 34 to selectively reinforce the casing 22 to withstand the fan blade 12' root impact. However it will be appreciated that the energy associated with the fan blade 12' root impact is considerably less than that associated with the main fan blade 12' impact which is borne by the main containment zone 30. As such, reinforcing ribs will generally not be required in this root impact zone 34.

Other flanges 44 or other similar features may also be provided on the casing 22 for other reasons, for example vibration damping or for mounting other components. However these flanges are not reinforcing ribs 2,4,6 and do not assist, and are not specifically provided, to improve the casing 22 strength. Nor do such flanges allow a reduced thickness casing shell 24 to be used as is the function of the ribs 2,4,6 of the invention.

In a further embodiment of the invention (not shown) the third, forward most, rib 6 is omitted. In this arrangement the first 4 and second 6 ribs provide sufficient strengthening of the casing 22 to withstand the blade impact. Furthermore by omitting the third rib the overall weight of the casing is reduced further. The positioning of the first 2 and second 4 ribs in relation to the operational position of the fan blade 12' is however the same. The ratios of the various dimensions $h, d, w, t_w$ of the ribs 2,4 and casing shell 24 thickness $t_1, t_2, t_3, t_4, t_5, t_6$ are also the same. It will be appreciated though that the casing thickness $t_2$ becomes the thickness of the casing forward of the second rib 4, rather than the thickness of the casing shell 24 between the second 4 and third 6 ribs.

As an example only of the invention, a containment casing 22 comprising only two ribs 2,4 as described above and substantially as shown in FIG. 2 with the exception of the third rib 6, has been tested and has shown satisfactory containment performance. The casing, which was made from a steel alloy, had a mean diameter at the fan of 1.2 m. The shell thickness $t_6$ of the casing shell in the forward zone 32 was approximately 2 mm. In the main containment zone 30 the thickness varied approximately from $t_2$ of 3.2 mm, $t_1$ of 5.2 mm to $t_3$ of 3.2 mm. In the root impact zone 34 the casing shell 24 thickness varied from $t_4$ of 3.2 mm to $t_5$ of 2.8 mm. The first rib 2 was axially positioned so as to be in the same radial plane 50 as running position of the trailing edge 47 of the fan blades 12'. The second rib 4 was axially positioned in the same radial plane 48 as the running position of the mid chord point 45 of the blades 12 45 of the fan blades 12'. The ribs had a radial height h of approximately 17.5 mm and a web thickness $t_w$ of approximately 4.0 mm. The rim portion of the ribs had a axial width w of approximately 15 mm and a rim thickness of approximately 4.3 mm. The forward fan catcher 26 was axially positioned just forward of the radial plane 46 passing through the running position of the leading edge 49 of the fan blades 12'. The fan 12 comprised an array of 24 individual fan blades 12' all mounted conventionally upon a single fan disc. Each fan blade 12' being of a hollow wide chord design, known in the art, having an individual mass of approximately 2 kg and a mean radial length of about 0.5 m. The fan 12 was designed and tested to rotate at speeds up to 7750 rpm.

It will be appreciated by those skilled in the art that the exact configuration of containment casing design shown in the FIGS. 2,3 can be varied to some degree without departing from the invention. For example a single reinforcing rib or alternatively any other number of reinforcing ribs can be used. Additional reinforcing ribs can also be provided on the casing shell 24 further strengthening the casing 22, but at the cost of additional weight. The thickness of the casing shell 24 can also be increased away from the optimum described, although this will obviously add additional weight to the casing design. Furthermore this casing design can also be combined with other known containment systems to provide improved fan blade 12' containment.

We claim:

1. A containment casing for a gas turbine engine comprising a substantially rigid casing shell arranged in operation coaxially with an axis of rotation of the gas turbine engine, and extending circumferentially around an array of fan rotor blades arranged to rotate about the engine axis, and in a region of predicted blade impact in the event of a fan blade failure, there being at least two reinforcing ribs which extend substantially radially from the casing and circumscribe, in a substantially circumferential direction, the outer periphery of the casing shell, wherein the ribs are of a generally T-shaped cross section comprising a substantially radially extending web portion and a rim portion, and wherein the first rib is positioned axially about the casing substantially entirely in a plane extending perpendicular to the axis of the casing and between a plane perpendicular to the casing axis passing through the operational positions of the trailing edges of the fan blades, and a plane perpendicular to the casing axis passing through the operational positions of the mid-chord points of the fan blades, and the second rib is positioned axially about the casing substantially entirely in a plane extending perpendicular to the axis of the casing and between the plane passing through the operational positions of the mid-chord points of the fan blades and a plane perpendicular to the casing axis passing through the operational positions of the leading edges of the fan blades and wherein said casing has a surface portion between said ribs and said surface portion is free of any protrusions extending therefrom.

2. A containment casing as claimed in claim 1 in which a third rib being provided, the third rib is axially positioned forward of the plane passing through the operational positions of the leading edges of the fan blades.

3. A containment casing as claimed in claim 1 in which the ratio of the axial width of the reinforcing rib rim portion, to the thickness of the casing shell radially adjacent to the operational position of the trailing edge portions of the fan blades, is in the range of 1 to 6; and the ratio of the radial height of the reinforcing web portion from the casing, to the thickness of the casing shell radially adjacent to the operational position of the trailing edge portions of the fan blades, is in the ratio of 1 to 6.

4. A containment casing as claimed in claim 1 in which the ratio of the thickness of the reinforcing rib rim portion, to the thickness of the casing shell radially adjacent to the operational position of the trailing edge portions of the fan blades, is in the range 0.4 to 2.0; and the ratio of the axial thickness of the reinforcing rib web portion, to the thickness of the casing shell radially adjacent to the operational position of the trailing edge portions of the fan blades, is in the range of 0.4 to 2.0.

5. A containment casing as claimed in claim 1 in which the ratio of the radial thickness of the casing in the region of the reinforcing ribs, to the thickness of the casing shell radially adjacent to the operational position of the trailing edge portions of the fan blades, is in the range of 0.4 to 2.0.

6. A containment casing as claimed in claim 1 in which the ratio of the thickness of the casing shell axially rearward of the operational position of the fan blades, to the thickness of the casing shell radially adjacent to the operational position of the fan blades, is in the range of 0.5 to 1.5.

7. A containment casing as claimed in claim 1 in which the ratio of the thickness of the casing shell axially rearward of the operational position of the fan blades, to the thickness of the casing shell radially adjacent to the operational position of the fan blades, is in the range of 0.4 to 1.5.

8. A containment casing as claimed in claim 1 in which the ratio of the thickness of the casing shell axially rearward of a region of the casing shell of predicted main blade root impact in the event of fan blade failure, to the thickness of the casing shell radially adjacent to the operational position of the fan blades is in the range of 0.3 to 1.5.

9. A containment casing for a gas turbine engine comprising a substantially rigid casing shell arranged in operation coaxially with an axis of rotation of the gas turbine engine, and extending circumferentially around an array of fan rotor believes arranged to rotate about the engine axis, and in a region of predicted blade impact in the event of a fan blade failure, there being at least two reinforcing ribs which extend substantially radially from the casing and circumscribe the outer periphery of the casing shell, wherein the ribs are of a generally T-shaped cross section comprising a substantially radially extending web portion and a rim portion, and wherein the first rib is positioned axially about the casing between a plane perpendicular to the casing axis passing through the operational positions of the trailing edges of the fan blades, and a plane perpendicular to the casing axis passing through the operational positions of the mid chord points of the fan blades, and the second rib is positioned axially about the casing between the plane passing through the operational positions of the mid-chord points of the fan blades and a plane perpendicular to the casing axis passing through the operational positions of the leading edges of the fan blades, a fan catcher being provided, said the fan catcher including a flange extending radially inwardly from an inner surface of the casing shell, said fan catcher being positioned axially up to half a chord length of the fan blades forward of a plane perpendicular to the casing axis passing through the operational positions of the leading edges of the fan blades.

10. A containment casing as claimed in claim 12 in which the ratio of the thickness of the casing shell forward of the fan catcher, to the radial thickness of the casing shell radially adjacent to the operational positions of the trailing edges portion of the fan blades, is in the range of 0.25 to 0.75.

11. A containment casing as claimed in claim 12 in which the ratio of the thickness of the casing shell forward of the fan catcher, to the radial thickness of the casing shell radially adjacent to the operational positions of the trailing edges portion of the fan blades, is in the range of 0.1 to 0.75.

* * * * *